UNITED STATES PATENT OFFICE.

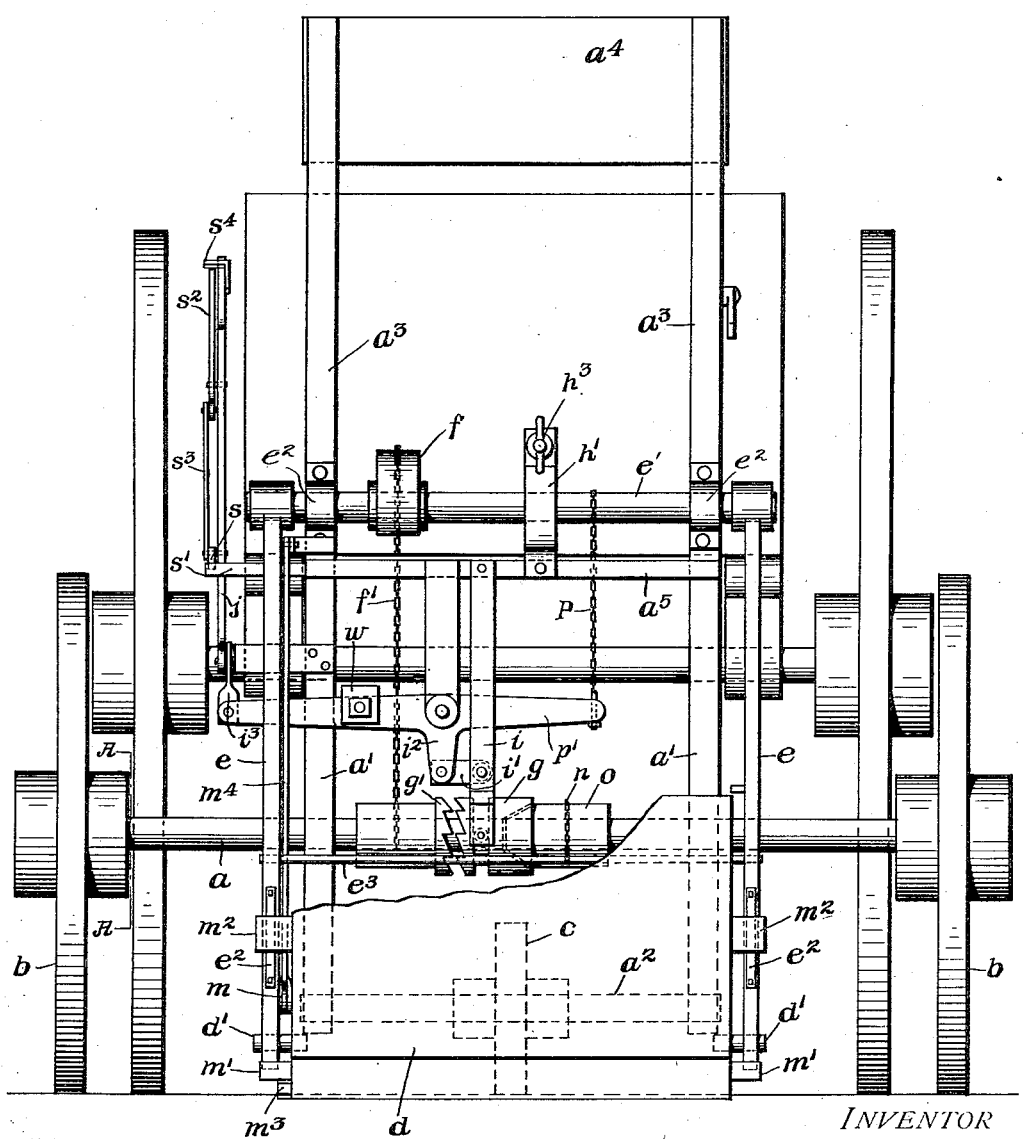

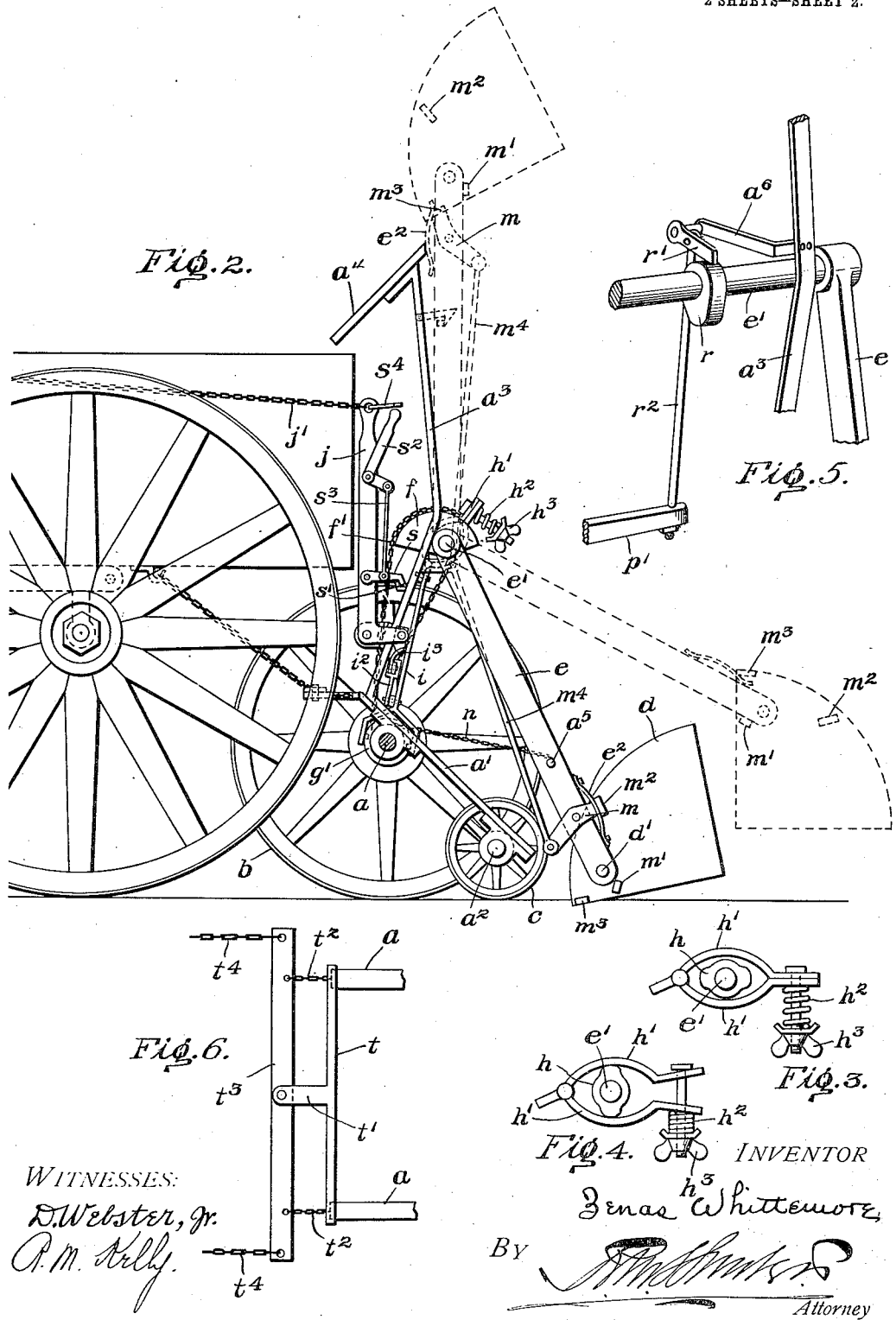

ZENAS WHITTEMORE, OF MORTON, PENNSYLVANIA.

SELF-LOADING CART.

No. 852,919.

Specification of Letters Patent.

Patented May 7, 1907.

Application filed November 15, 1905. Serial No. 287,461.

*To all whom it may concern:*

Be it known that I, ZENAS WHITTEMORE, of Morton, county of Delaware, and State of Pennsylvania, have invented an Improvement in Self-Loading Devices for Carts, &c., of which the following is a specification.

A part of my improvements relates to the collecting device by which the material to be loaded is collected and conveyed to the cart. I employ a pivoted collecting device which by means of suitably placed stops is caused to assume the proper position for collecting the material, and when elevated, to rock into proper position to retain the contents and finally to discharge them into the cart.

My invention also embraces improvements in the means for controlling the collecting device while it is operating to take up the material, so that, the proper pressure or tension may be obtained. This is particularly of importance when the collecting device is a scoop used for digging, as in grading operations.

My invention also embraces other improvements which are fully set forth hereafter.

In the drawings: Figure 1 is an end elevation of my improved self loading device, with part of the pan broken away to expose the clutch mechanism; Fig. 2 is a side elvation, the axle shaft being shown in section on the line A—A of Fig. 1; Figs. 3 and 4 are enlarged detail views of one form of the devices for retarding the descent of the collecting devices; Fig. 5 is a perspective view showing another form of the devices for automatically releasing the clutch; and Fig. 6 is a detail plan view showing a method of connecting the attachment with a cart.

While I have shown the self loading device carried by a separate wheeled truck adapted to be detachably connected with a cart, they may, if desired, be fixedly connected with the cart and form a part thereof. It is to be understood therefore, that when the term "wheeled frame" is used in the claims, it refers, unless otherwise limited, either to the cart or vehicle carrying the receptacle or to the separate wheeled truck. I prefer, however, to arrange all of the self-loading devices on a separate and independent wheeled frame or truck, which may be detached from the cart, when the latter is filled, and attached to an empty cart, while the previously filled cart is driven off to the place of deposit or "dump."

$a$ is the axle of the attachment to which the wheels $b\ b$ are secured.

$a'\ a'$ is a truck frame supported at one end by the shaft $a$ and at its lower end by a small wheel $c$ mounted on a shaft $a^2$ in the lower ends of the arms of the truck-frame.

$d$ is the collecting device, which while here shown as a scoop or pan, may be of any suitable construction, according to the particular use to which the apparatus is applied.

The pan or collecting device is carried by arms $e\ e$ on a rock shaft $e'$ which is journaled in bearings $e^2$ on upward extension $a^3\ a^3$ of the arms of the truck frame.

$f$ is a cam on the rock-shaft $e'$ connected by a chain or cable $f'$ with the loose member $g'$ of a clutch on the axle shaft $a$. The other member $g$ of this clutch is keyed to the shaft, and when it is moved into engagement with the member $g'$ the chain $f'$ will be wound upon the drum of the member $g'$, thus rocking the shaft $e'$ and elevating the pan or scoop $d$, as shown in dotted lines in Fig. 2 into position to discharge its contents into the cart.

The extensions $a^3\ a^3$ of the truck-frame are shown provided with a transverse inclined guide $a^4$ to direct the discharged contents of the pan into the cart.

When the clutch $g'$ is released the pan will return by gravity rotating the shaft $e'$ and unwinding the chain $f'$ from the shaft $a$. For the purpose of shifting the clutch member $g$ I employ a shifting yoke $i$ pivoted to the' cross bar $a^5$ and connected by a link $i'$ with a bell crank lever $i^2$ pivoted on the truck-frame. The other end of the bell crank lever is connected by a link $i^3$ with a bell crank operating lever $j$ pivoted on the truck frame. The operating lever may be manipulated directly or by a chain or rope $j'$ from the driver's seat.

To release the clutch automatically after the pan has been elevated and has discharged its contents I employ the chain $p$ connected with the rock-shaft $e'$ and arm $p'$ of the clutch shifting lever $i^2$. The length of this chain is such that when the arms $e\ e$ and pan have reached their highest position it will be wound upon the shaft $e'$ to an extent sufficient to be placed under enough tension to rock the lever $i^2$ through the arm $p'$ and operate the yoke $i$ to release the clutch.

Another form of clutch releasing mechanism is shown in Fig. 6. Here the shaft $e'$ carries a cam $r$ acting on a lever $r'$ pivoted to a bracket $a^6$ on one of the truck frame members $a^3$, and connected by a link $r^2$ with the arm $p'$ of the bell crank lever $i^2$. When the cam $r$ lifts the lever $r'$ at the moment the pan is fully elevated it will rock the bell crank lever $i^2$ through the link $r^2$ and release the clutch.

As shown the collecting device $d$ is a scoop and to render it effective for this purpose its front edge must be depressed at an angle to the surface and locked in that position while it is operating. For this purpose the pan is pivoted at its ends in the arms $e$ and is provided on the ends with two stop lugs $m'$ $m^2$, the stops $m'$ beng adjacent to and slightly in the rear of the lower front edge, and the stops $m^2$ adjacent to the inner edge above the arms $e$ $e$ when the pan is lowered. When in this position the stops $m^2$ $m^2$ are in contact with the arms $e$ $e$, which are preferably provided with leaf springs $e^3$ at the point of contact to prevent jarring. As the front edge of the pan is drawn forward these stops $m^2$ $m^2$ will hold the pan with its front edge depressed in the ground.

When the arms $e$ $e$ are raised the weight of the pan will cause it to rock on its pivots $d'$ $d'$, until the stop $m'$ strikes the arms $e$ $e$, as shown in the lowest position in dotted lines in Fig. 2.

To maintain the pan rigidly in this position until it has been fully elevated and has discharged its contents, I employ means for automatically locking the pan to the arm during the latter part of its elevation. As shown these means consist of a dog $m$ pivoted on the lower end of one arm $e$, and an additional stop lug $m^3$ on the pan adjacent to the lower front edge. The dog $m$ is connected by a rod $m^4$ with the truck frame below the shaft $e'$, and as the arms $e$ $e$ are elevated this rod $m^4$ acts on the dog $m$ to move it into engagement with the lug $m^3$ and thus to lock the pan, as shown in dotted lines in the highest position in Fig. 2. I have shown this dog $m$ and lug $m^3$ at one end of the pan only, but one may be at each end if desired.

When the pan is lowered the operations are reversed, the dog $m$ first releases the lug $m^3$, and when the pan reaches the ground it is thrown back into the position shown in full lines in Fig. 2 with the lugs $m^2$ $m^2$ in contact with the arms $e$ $e$.

To force the front edge of the pan into the earth when in its lowered position, I employ a chain $n$ connecting the pan arms (as through the cross bar $e^3$) with a friction clutch on the axle shaft $a$. As shown this friction clutch consists of a loose member $o$ and the clutch member $g$ controlled by the yoke $i$. The tension of this friction clutch may be regulated by an adjustable weight $w$ on the lever $i^2$ which controls the yoke $i$ and clutch member $g$. By regulating this weight $w$ the proper friction may be imposed on the clutch member $o$ to cause the pan to cut into the earth without excessive resistance.

The springs $e^2$ $e^2$ act as buffers to prevent excessive jarring not only by contact with the lugs $m^2$ $m^2$ when the pan is lowered, but also by contact with the top of the truck frame when the pan is elevated.

To prevent the pan descending with an excessive jar I prefer to employ a suitable check or retarding device. As shown in Figs. 1—4 this check consists of a split yoke $h'$ $h'$ embracing a cam $h$ on the rock shaft $e'$ and held closed by a spring $h^2$. The yoke is carried by the cross bar $a^5$ of the truck-frame. When the pan is at its highest point this cam $h$ occupies the position shown in Fig. 3, out of contact with the yoke members, but as the pan descends and the shaft rocks, the cam acts upon the yoke members and separates them against the tension of the spring $h^2$, as shown in Fig. 4, and the descent of the pan will be retarded by the friction imposed by the yoke members. This friction may be regulated by adjusting the tension of the spring $h^2$ by a thumb screw $h^3$.

The pan elevating mechanism which has been described will impart to the pan merely a rocking motion about the shaft $e'$ as an axis. In some cases, depending on the use to which the pan or collecting device is put, it is desirable also to impart a reciprocating movement, i. e. to shift the position of the axis, as well as to rock the pan through an arc. In such cases, instead of the particular mechanism here shown for elevating or rocking the pan, the elevating devices shown in my Letters Patent 793,700, dated July 4th, 1905, may be employed.

When it is desired to operate the cart without loading or operating the scoop $d$, the friction clutch $o$ may be thrown out of connection by locking the lever $j$ with the clutch member $g$ out of frictional contact with the clutch member $o$. For this purpose I have shown a pivoted latch $s$ on the lever $j$, adapted to engage a lug $s'$ on the truck frame and operated by a small bell crank lever $s^2$ on the lever $j$ connected with the latch by a link $s^3$. The lever $s^2$ and latch $s$ may be locked out of action by a link or catch $s^4$.

When the self loading devices are carried by a separate truck, I prefer to employ the means of attachment shown in Fig. 5. $t$ is a cross bar of the truck frame $a$ pivoted by a tongue $t'$ to a swingle tree $t^3$ with which the ends of the cross bar are also connected by short chains $t^2$ $t^2$. The ends of the swingle tree $t^3$ are connected with the cart by chains $t^4$ $t^4$. This connection permits perfect freedom of movement in the truck frame to suit irregularities in the surface of the ground.

What I claim as new and desire to secure by Letters Patent, is:

1. In a self-loading device, the combination of rocking arms, a collecting device pivotally connected with said rocking arms, stops to limit the rocking of said collecting device on its pivotal connection with said arms, and means to rock said arms to raise and lower the collecting device carried thereby.

2. In a self-loading device, the combination of rocking arms, a collecting device pivotally connected with said rocking arms, stops to limit the rocking of said collecting device on its pivotal connection with said arms, means to rock said arms to raise and lower the collecting device carried thereby, and an automatic locking device to lock said collecting device against movement on its pivotal connection when it is elevated.

3. In a self-loading device, the combination of rocking arms, a collecting device pivotally connected with said rocking arms, stops to limit the rocking of said collecting device on its pivotal connection with said arms, means to rock said arms to raise and lower the collecting device carried thereby, and an automatic locking device to lock said collecting device against movement on its pivotal connection when it is elevated and to unlock it when it is lowered.

4. In a self-loading device, the combination of rocking arms, a collecting device pivotally connected with said rocking arms, stops to limit the rocking of said collecting device on its pivotal connection with said arms, means to rock said arms to raise and lower the collecting device carried thereby, a locking device carried by said arms and adapted to engage the collecting device and lock it against movement on its pivots, and means controlled by the movement of the arms to actuate said locking device when the arms are elevated.

5. In a self-loading device, the combination of rocking arms, a collecting device pivotally connected with said rocking arms, stops to limit the rocking of said collecting device on its pivotal connection with said arms, means to rock said arms to raise and lower the collecting device carried thereby, a pivoted dog $m$ carried by a rocking arm, a lug $m^3$ carried by the collecting device and adapted to be acted upon by the dog, and a rod $m^4$ connecting the dog with a support eccentric to the axis of the rocking arms whereby the rocking of said arms will cause said rod to actuate the dog and engage the lug $m^3$ 6. In a self-loading device, the combination of a rocking frame, a collecting device pivotally connected with said rocking frame, and a stop to limit the movement of said collecting device on its pivots while it is being lifted by the rocking frame.

7. In a self-loading device, the combination of a wheeled vehicle, a rocking frame carried thereby, a collecting device pivotally connected with said rocking frame, and means connected with the vehicle for pulling the collecting device forward with a yielding tension.

8. In a self-loading device, the combination of a wheeled vehicle, a rocking frame carried thereby, a collecting device carried by said rocking frame, and a yielding connection between said rocking frame and the axle of the wheeled vehicle.

9. In a self-loading device, the combination of a wheeled vehicle, a rocking frame carried thereby, a collecting device carried by said rocking frame, a friction clutch on the axle of the wheeled frame, and a connection between said friction clutch and rocking frame.

10. In a self-loading device, the combination of a wheeled vehicle, a rocking frame carried thereby, a collecting device carried by said rocking frame, power transmitting devices between the rocking frame and the axle of the vehicle embracing a clutch, a friction clutch on said axle and a connection between said friction clutch and the rocking frame.

11. In a self-loading device, the combination of a wheeled vehicle, a rocking frame carried thereby, a collecting device carried by said rocking frame, a friction clutch on the axle of the wheeled vehicle, a flexible connection between the rocking frame and loose member of the friction clutch, and means to adjust the tension of the other member of said friction clutch.

12. In a self-loading device, the combination of a wheeled vehicle, a rocking frame carried thereby, a collecting device carried by said rocking frame, a loose clutch member $g'$ on the axle of the wheeled vehicle, a loose friction clutch member $o$ also on the axle of the wheeled vehicle, a flexible connection between the clutch member $o$ and the rocking frame, and a clutch member $g$ arranged to act in conjunction with either clutch member $g'$ or $o$.

13. In a self-loading device, the combination of a wheeled vehicle, a rocking frame carried thereby, a collecting device carried by said rocking frame, a loose clutch member $g'$ on the axle of the wheeled vehicle, a loose friction clutch member $o$ also on the axle of the wheeled vehicle, a flexible connection between the clutch member $o$ and the rocking frame, a clutch member $g$ arranged to act in conjunction with either clutch member $g'$ or $o$, and means to adjust the tension of said clutch member $g'$ on the friction clutch member $o$.

14. In a self-loading device, the combination of a wheeled vehicle, a rock shaft carried thereby, power transmitting connections between the rock shaft and the axle of the vehicle, embracing a clutch, manually controlled devices for operating said clutch at will, arms carried by the rock shaft, a collecting device carried by said arms, and clutch actuating devices for operating said clutch, controlled by the rock shaft.

15. In a self-loading device, the combination of a wheeled vehicle, a rocking frame carried by the vehicle, a collecting device pivotally supported by said rocking frame, stops to limit the forward movement of the collecting device on its pivots, and a yielding connection between the rocking frame and the axle of the wheeled vehicle.

16. In a self-loading device, the combination of a wheeled vehicle, a rock shaft carried thereby, a collecting device carried by said rock shaft, power transmitting connections between the rock shaft and the axle of the vehicle, embracing a clutch, and a retarding device acting on the rock shaft to retard its rotation when the collecting device is lowered.

17. In a self-loading device, the combination of a wheeled vehicle, a rock shaft carried thereby, a collecting device carried by said rock shaft, power transmitting connections between the rock shaft and the axle of the vehicle embracing a clutch, a cam on the rock shaft, and a friction device acting on said cam to retard the rotation of the rock shaft when the collecting device is lowered.

18. In a self loading device, the combination of rocking arms, a collecting device priotally connected with said arms, and means to rock said arms and raise and lower the collecting device carried thereby.

In testimony of which invention, I hereunto set my hand.

ZENAS WHITTEMORE.

Witnesses:
GEO. M. PALM,
J. F. BEATTY.